(12) United States Patent
Neema et al.

(10) Patent No.: US 8,327,311 B1
(45) Date of Patent: Dec. 4, 2012

(54) GENERATING A SIMULATION MODEL OF A CIRCUIT DESIGN

(75) Inventors: Hem C. Neema, San Jose, CA (US); Sonal Santan, San Jose, CA (US); Kumar Deepak, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/188,407

(22) Filed: Jul. 21, 2011

(51) Int. Cl.
*G06F 17/50* (2006.01)
*G06F 11/22* (2006.01)

(52) U.S. Cl. ........................ 716/136; 716/100
(58) Field of Classification Search .............. 716/100, 716/136
See application file for complete search history.

(56) References Cited

U.S. PATENT DOCUMENTS

| | | | | |
|---|---|---|---|---|
| 6,466,898 B1* | 10/2002 | Chan | | 703/17 |
| 2004/0039844 A1* | 2/2004 | Bonn | | 709/245 |
| 2008/0098246 A1* | 4/2008 | Kim | | 713/323 |
| 2011/0314316 A1* | 12/2011 | Kim | | 713/323 |
| 2012/0072742 A1* | 3/2012 | Peng | | 713/300 |
| 2012/0185713 A1* | 7/2012 | Lin | | 713/323 |

OTHER PUBLICATIONS

Lawrence, Jay and Ussery, Cary, INCA: A Next-Generation Architecture for Simulation, Verilog HDL Conference, 1996 IEEE International Proceedings, Feb. 26-28, 1996, pp. 12-15, Santa Clara, CA, USA.

* cited by examiner

*Primary Examiner* — Jack Chiang
*Assistant Examiner* — Magid Dimyan
(74) *Attorney, Agent, or Firm* — LeRoy D. Maunu

(57) ABSTRACT

Approaches for generating functions for activating processes in a simulation model. At least two mutually exclusive sub-ranges of a plurality of bits of a net of the circuit design are determined. A respective process set associated with each sub-range of the plurality of bits is determined. The specification of a wakeup function includes for each sub-range of the plurality of bits, a test for a change in value of at least one bit in the sub-range of the plurality of bits, and an initiation of each process in the associated process set in response to a detected change in value of the at least one bit. The specification also includes control, responsive to a detected change in value of at least one bit in one of the sub-ranges, that bypasses a test for a change in value of at least one bit in at least one other of the sub-ranges.

19 Claims, 8 Drawing Sheets

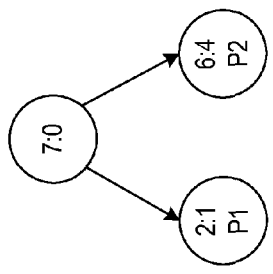
*FIG. 2*
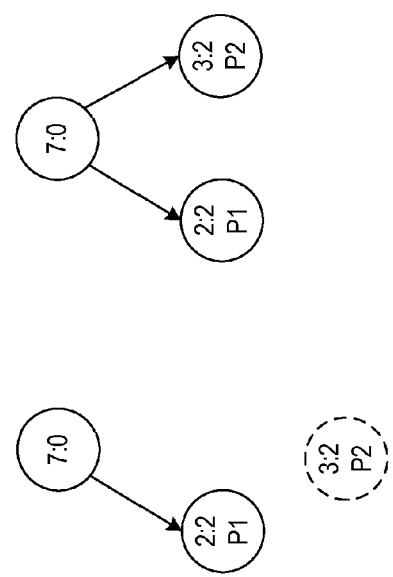
*FIG. 3-3*
*FIG. 3-2*
*FIG. 3-1*

GENERATING A SIMULATION MODEL OF A CIRCUIT DESIGN

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more embodiments generally relate to generating a simulation model of a circuit design.

BACKGROUND

Event-driven hardware description language (HDL) simulation is a way to verify that a circuit design will operate correctly. With the continuing increase in resources available on integrated circuits and the corresponding increase in size of circuit designs, the time spent in simulating circuit designs is growing. Increases in the time spent in simulation activities increases development costs and delays the time-to-market of a particular design.

SUMMARY

In one embodiment, a method of generating one or more functions for activating processes in a simulation model of a circuit design is provided. The method includes using a processor to perform one or more operations. The operations include determining at least two mutually exclusive sub-ranges of a plurality of bits of a net of the circuit design. Each of the sub-ranges includes at least one bit of the plurality of bits of the net. A respective process set associated with each sub-range of the plurality of bits is determined. Each process set specifies one or more processes to activate in response to a change in value of a bit in the associated sub-range of the plurality of bits. A specification of a wakeup function in the simulation model is generated. The specification includes for each sub-range of the plurality of bits, a test for a change in value of at least one bit in the sub-range of the plurality of bits, and an initiation of each process in the associated process set in response to a detected change in value of the at least one bit. The specification further includes control, responsive to a detected change in value of at least one bit in one of the sub-ranges of the plurality of bits, that bypasses a test for a change in value of at least one bit in at least one other of the sub-ranges of the plurality of bits.

In another embodiment, a non-transitory computer-readable medium is provided with executable code stored thereon for simulation of a circuit design, wherein the executable code when executed on a processor perform a method that includes determining at least two mutually exclusive sub-ranges of a plurality of bits of a net of the circuit design. Each of the sub-ranges includes at least one bit of the plurality of bits of the net. The method further includes determining a respective process set associated with each sub-range of the plurality of bits. Each process set specifies one or more processes to activate in response to a change in value of a bit in the associated sub-range of the plurality of bits. A specification of a wakeup function in the simulation model is generated. The specification includes for each sub-range of the plurality of bits, a test for a change in value of at least one bit in the sub-range of the plurality of bits, and an initiation of each process in the associated process set in response to a detected change in value of the at least one bit. The specification further includes control, responsive to a detected change in value of at least one bit in one of the sub-ranges of the plurality of bits, that bypasses a test for a change in value of at least one bit in at least one other of the sub-ranges of the plurality of bits.

A method of simulating subcircuits that are sensitive to changes in values of a plurality of bits of a net in a simulation model of a circuit design is provided in another embodiment. The method includes using a processor to perform one or more operations, including testing for a change in value of at least one bit in a sub-range of the plurality of bits of the net. The sub-range of the plurality of bits is one of at least two mutually exclusive sub-ranges of the plurality of bits in the simulation model. Each sub-range of the plurality of bits has a respectively associated process set. Each process set specifies one or more processes that model respective ones of the subcircuits. In response to a change in the value of at least one bit in the sub-range of the plurality of bits, each process in the associated process set is invoked, and testing for a change in at least one bit in at least one other of the at least two sub-ranges of the plurality of bits is bypassed.

It will be appreciated that various other embodiments are set forth in the Detailed Description and Claims which follow.

BRIEF DESCRIPTION OF THE DRAWINGS

Various aspects and advantages of the disclosed embodiments will become apparent upon review of the following detailed description and upon reference to the drawings in which:

FIG. 2 shows a graph created from a net having two processes (P1 and P2) that are sensitive to mutually exclusive sets of bits of the net;

FIGS. 3-1-3-3 show a sequence of the states of a graph created from a net having two processes that are sensitive to bits of the net, and the bits to which one process is sensitive are a subset of the bits to which the other process is sensitive;

FIGS. 4-1-4-3 show a sequence of the states of a graph created from a net having two processes that are sensitive to bits of the net, and the subset of bits to which one process is sensitive to overlap or intersect the subset of the bits to which the other process is sensitive;

FIGS. 5-1-5-6 show a sequence of states of a graph created from a net having multiple processes with overlapping sensitivities on the bus;

FIG. 6 is a flowchart of an example process for generating a specification of a wakeup function for processes that are sensitive to bits of a net from the generated net sensitivity graph;

DETAILED DESCRIPTION OF THE DRAWINGS

Figure 1:
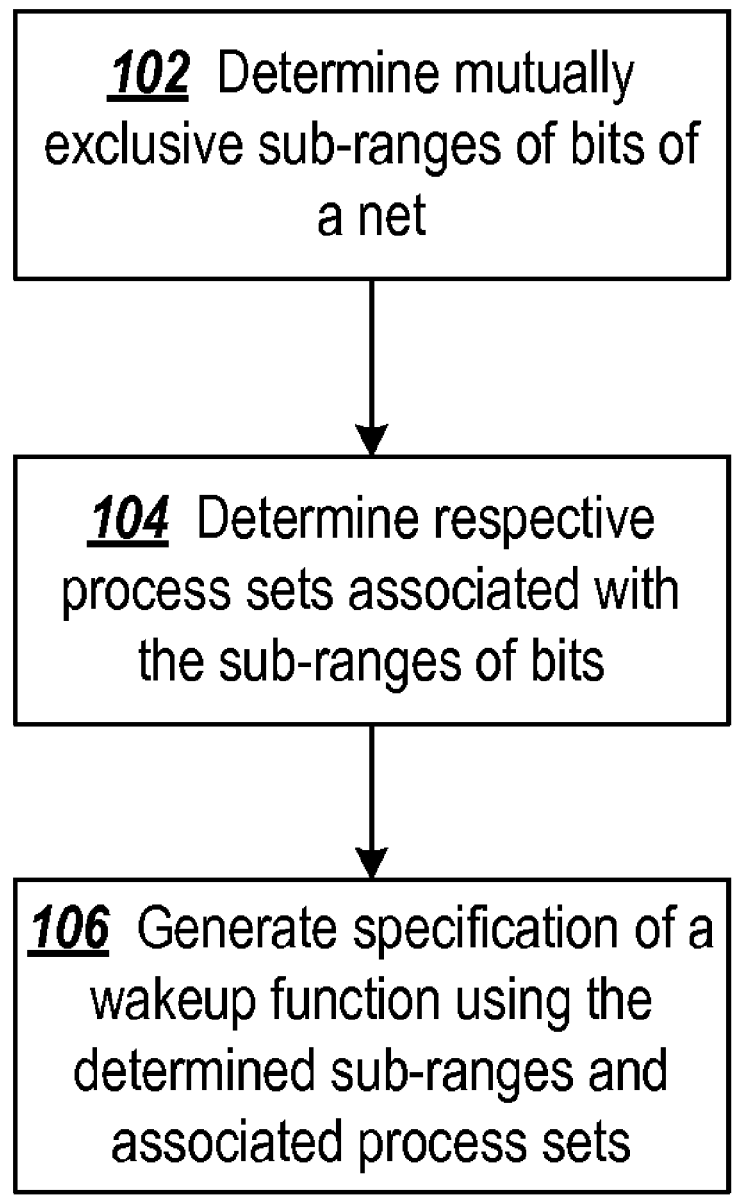
FIG. 1 is a flowchart showing the general process for generating a function for activating processes that are sensitive to changes in a net in a simulation model of a circuit design.

In simulating an HDL circuit design, the HDL description is compiled into a simulation model. In many cases the simulation model is executable program code. Many simulation models include wakeup functions for activating HDL processes that are sensitive to bits on a bus of the circuit design. A wakeup function is used to simulate how different bits of the same bus wakeup different HDL processes when new values are assigned to them. Depending on the construction of a wakeup function, time may be unnecessarily spent in executing the wakeup function, which wastes valuable simulation time.

For purposes of illustration, Verilog HDL is used in the examples below. Those skilled in the art will appreciate, however, that the teachings herein are also applicable to other HDL languages, such as VHDL 2008 and System Verilog. The examples show the creation of a wakeup function from a declared bus (or "net") and HDL processes that are sensitive to changes in values of bits of the bus.

A bus w, can be declared as follows:
  wire [7:0] w;
During simulation in a net based event driven simulator, whenever there is an HDL assignment to w, for example, assign #5 w=8'b1111_0000, or, assign w[6:3]=4 'b1111 (partial assignment), a compiler-generated wakeup function for w will be called. This function checks which bits of the bus w will change when the new value newvalue is applied, and based on this, it schedules relevant processes to the kernel run-time process execute list.

For example, if there are two processes, specified as:
  p1:always @w(2:1); p2:always @w(6:4)
then the wakeup function needs to add p1 to the execute list only if bits 2 or 1 have changed and add p2 to the execute list only if bits 6, 5 or 4 have changed. An example wakeup function prototype is as follows:
  void wakeup_w(newValue, startIndex, endIndex) {
  //Function's job is to find out when the "newValue" is
    applied between ranges "startIndex" and "endIndex" to
    the signal "w" which processes (if any) should be woken
    up.
  }
The wakeup function takes the newValue which is to be applied to w on the range between startIndex and endIndex. For example, the argument would be ("1111_0000", 0, 7) or ("1111", 3, 6) in the two assignment examples above. The wakeup function then looks for the bits that will change as a result of applying this new value, finds processes that are sensitive to the bits (if any) that will change, and then adds the processes to the process execute list. For example, if as a result of applying the newValue, only bit 2 is going to change, then only p1 needs to be added to the process execute list. The wakeup function can be called many times while the simulation is running. In one approach, the wakeup function may be implemented as shown in Example 1.

```
void wakeup_w(newValue, startIndex, endIndex) {
  if (change(w[startIndex]))
    add_processes_to_execute_list(process_set_1);
  if (change(w[startIndex+1]))
    add_processes to_execute_list(process_set_2);
  if (change(w[startIndex+2]))
    add_processes_to_execute_list(process_set_3);
    ...
  if(change(w[endIndex]))
    add_processes_to_execute_list
       (process_set_<endIndex-startIndex+1>);
}
```

Example 1

Since the same process can be in more than one process_set_<>, the number of such process sets per net will be equal to the size of the net. In the example, there will be 8 such process sets because w is 8 bits wide. The parameters startIndex and endIndex will span the entire bit range of the bus (0 to 7) in the example.

In view of the continually increasing sizes of buses, the size of the wakeup function, which is generated at compile time and executed during simulation for any assignment on w, would increase significantly. The impact may be observed in long compile times and long simulation run times. Every time the wakeup function is called, it will perform a check on every bit of the bus to see if it will change as a result of the assignment. Also the large number of process sets will increase memory requirements.

According to one or more embodiments, the generated wakeup function uses a minimal number of sub-ranges of the bits of a net to check for changes in bit values and initiating associated processes. This provides for efficient compilation of the HDL into an efficient wakeup function. An example wakeup function is shown in Example 2.

```
//Copyright XILINX, Inc., 2011
void wakeup_w(newValue, startIndex, endIndex) {
    ...
    if (change(w[{range_1}]) ) {
        add_processes_to_execute_list(process_set_a_1);
        if(change(w[{range_1_1}]) {
            add_processes_to_execute_list(process_set_a_1_1);
            if(change(w[{range_1_1_1}]) {
                add_processes_to_execute_list
                   (process_set_a_1_1_1);
                ...
            }
            if(change(w[{range_1_1_2}] ) {
                add_processes_to_execute_list
                   (process_set_a_1_1_2);
                ...
            }
        }
        if(change(w[range_1_2}]) {
            add_processes_to_execute_list(process_set_a_2);
            ...
        }
        ...
    } if (change(w[{range_2}]) {
        add_processes_to_execute_list(process_set_b);
        if( ... ) { }
        if( ... ) { }
    } if (change(w[{range_3}]) {
        add_processes_to_execute_list(process_set_c);
        if( ... ) { }
        if( ... ) { }
    }
    ...
}
```

Example 2

In the example wakeup function, each range implies a range of bits specified by a pair of indices, {index1, index2}. Ranges labeled as range_1, range_2, and range_3 are mutually exclusive subsets or sub-ranges of the bits of the net. The ranges range_1_1 and range_1_2 are sub-ranges of range_1. The ranges range_1_1 and range_1_2 are mutually exclusive sub-ranges of range_1. The process set process_set_a_1 identifies the processes that are sensitive to w[range_1].

In one or more embodiments, the wakeup function supports simulating subcircuits that are sensitive to changes in values of a plurality of bits of a net in a simulation model of a circuit design. When the wakeup function is executed during simulation of a circuit design, each call to the change function tests for a change in value of any of the bits of the specified sub-range. The wakeup function has the range of bits of the net divided into two or more mutually exclusive sub-ranges of bits. Each of the sub-ranges of bits has an associated process set that identifies processes that model the subcircuits that are sensitive to the bits in the sub-range. In response to a change in the value of at least one bit in the sub-range of the plurality of bits, the wakeup function invokes each process in the associated process set. By suitably associating process sets with mutually exclusive sub-ranges of bits of the net, once a change in a bit in one sub-range is detected, the wakeup function can bypass testing for changes in one or more others of the sub-ranges.

By constructing the wakeup function to check for changes in mutually exclusive sub-ranges of bits of the net according to the processes that are sensitive to the bits in the sub-ranges (range_1, range_2, range_3), only a minimal set of checking need be performed when the wakeup function is executed. For sub-ranges of sub-ranges, for example, range_1_1, the change function is called only if a change in value of a bit in the parent range (range_1) was detected. In addition, the generated wakeup function will not contain code for checking for changes in bits to which no processes are sensitive. This reduces the time spent by wakeup functions checking for changes in bit values during simulation runtime. One or more embodiments also reduce the number of process sets, which reduces memory requirements.

It will be appreciated that even though if and else-if statements are used in the examples and description, other control flow statements may be used. For example, equivalent wakeup functions may be constructed using switch, case, and/or goto statements.

FIG. 1 is a flowchart showing the general process for generating a function for activating processes that are sensitive to changes in a net in a simulation model of a circuit design. At block 102, the process determines mutually exclusive sub-ranges of a plurality of bits of a net of the circuit design. At block 104, respective process sets are determined for and associated with the sub-ranges of bits. Each process set specifies one or more processes to activate in response to a change in value of a bit in the associated sub-range of the plurality of bits.

A specification of a wakeup function in the simulation model is generated using the determined sub-ranges and associated process sets at block 106. For each sub-range of the plurality of bits, the specification includes a test for a change in value of at least one bit in the sub-range of the plurality of bits and an initiation of each process in the associated process set in response to a detected change in value of the at least one bit. The specification further includes control structures or statements that are responsive to a detected change in value of at least one bit in one of the sub-ranges of the plurality of bits. One or more of the control statements bypass a test for a change in value of the bits in at least one other of the sub-ranges of the plurality of bits.

In one embodiment, a respective wakeup function is generated for each net in the circuit design. Thus, processing of blocks 102, 104, and 106 would be performed for each net encountered in compiling the circuit design into a simulation model.

In one embodiment, a hierarchical graph is created to model the mutually exclusive sub-ranges and associated process sets. Once complete, the graph is used to generate the specification of the wakeup function. The hierarchical graph, or net sensitivity graph, includes parent and children nodes and edges connecting the parent and children nodes. Each node represents a sub-range of the plurality of bits of the net, each child node represents a sub-range of a sub-range of the plurality of bits of a parent node, and the sub-ranges of the plurality of bits of each child node of a parent node are mutually exclusive sub-ranges of the sub-range of the plurality of bits of the parent node.

FIG. 2 through FIGS. 5-6 show examples in which net sensitivity graphs are created for use in generating wakeup functions. In describing the scenarios and building of the graphs, the algorithm by which the graphs are created is described.

Figures 3, 4:
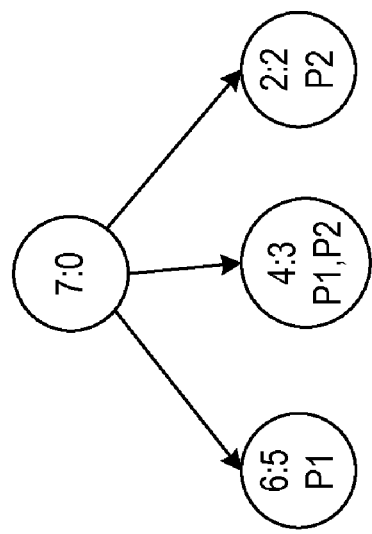
Figures 2, 4:
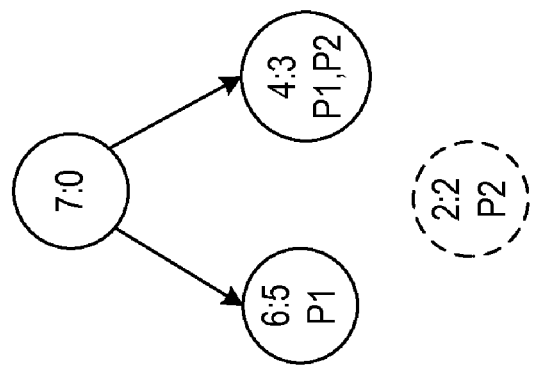
Figures 1, 4:
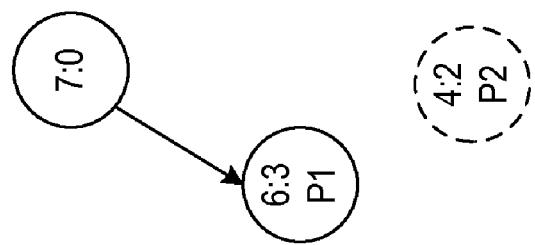

FIG. 2 shows a graph created from a net having two processes (P1 and P2) that are sensitive to mutually exclusive sets of bits of the net. In this scenario, bus w has bits 7:0, and processes P1 and P2 are sensitive to disjoint subsets of the bits of the bus, respectively. The graph is constructed based on the following HDL declarations:

wire [7:0] w; always @w(2:1)//P1; always @w(6:4)//P2

The example begins with node 2:1 already present in the graph and a node for sub-range 6:4 to be added. Since the sub-range 6:4 to be added is mutually exclusive from the existing child sub-range 2:1 of the parent 7:0, a node 6:4 for the sub-range is added as a child of the parent 7:0. The nodes 2:1 and 6:4 are shown with the process sets associated with the sub-ranges, with the process set associated with sub-range 2:1 including P1, and the process set associated with sub-range 6:4 including P2.

The wakeup function generated from the graph if FIG. 2 is:

```
//Copyright XILINX, Inc., 2011
void wakeup_w (newValue, startIndex, endIndex) {
    . . .
    if (change (w[2:1])) {
        add_processes_to_execute_list ({P1});
    }
    if (change w(6:4)) {
        add_processes_to_execute_list ({P2});
    }
}
```

FIGS. 3-1-3-3 show a sequence of the states of a graph created from a net having two processes that are sensitive to bits of the net, and the bits to which one process is sensitive are a subset of the bits to which the other process is sensitive. The sequence of graphs is based on the compiler processing the following declarations as contained in the HDL specification:

wire [7:0] w; always @w(2)//P1; always @w(3:2)//P2

FIGS. 3-1 shows the state of the graph after the compiler has encountered the declaration of w and the declaration of P1 being always sensitive to bit 2 of w. The graph includes nodes 7:0 and 2:2. A node for 3:2 has not been added to the graph because the declaration of P2 has not yet been encountered. This is represented by the dashed circle 3:2.

The compiler, in response to encountering the declaration of P2 being always sensitive to the sub-range 3:2 of w, adds the node with the process set containing P2 as a child of node 7:0 as shown in FIGS. 3-2. Since new node 3:2 specifies a sub-range that wholly contains the existing child sub-range 2:2, the node 2:2 is made a child of the node 3:2. The wakeup function generated from the graph if FIGS. 3-3 is:

```
//Copyright XILINX, Inc., 2011
void wakeup_w (newValue, startIndex, endIndex) {
    . . .
    if (change (w[3:2])) {
        add_processes_to_execute_list ({P2});
        if (change (w[2:2])) {
            add_processes_to_execute_list ({P1});
        }
    }
}
```

FIGS. 4-1-4-3 show a sequence of the states of a graph created from a net having two processes that are sensitive to bits of the net, and the subset of bits to which one process is sensitive to overlap or intersect the subset of the bits to which the other process is sensitive. The sequence of graphs is based on the compiler processing the following declarations as contained in the HDL specification:

wire [7:0] w; always@(6:3)//P1; always@(4:2)//P2

The HDL shows process P1 being always sensitive to bits 6:3 of w, and process P2 being always sensitive to bits 4:2 of w. The sub-ranges of bits overlap, but neither set of bits subsumes the other.

FIGS. 4-1 shows the state of the graph after the compiler has processed the declarations of w and of P1 being always sensitive to bits 6:3 of w. The declaration of P2 being always sensitive to 4:2 remains to be processed.

FIGS. 4-2 shows the state of the graph after the compiler has encountered the declaration of P2 being always sensitive to 4:2. Since the sub-range 4:2 to be added intersects existing child sub-range 6:3, the sub-range to be added and the existing child sub-range are split into mutually exclusive sub-ranges, 6:5 and 4:3. A node is added for the new sub-range 4:3 as a child of the parent node, and add the associated process set ({P1}) of the child sub-range 6:3 is added to the process set of the new sub-range 4:3. The resulting process set is {P1,P2}. The non-intersecting portion 2:2 of the original sub-range 4:2 remains as a node to be added. A node may be added to the graph for sub-range 2:2 as described in the scenario shown in FIG. 2.

The wakeup function generated from the graph if FIGS. 4-3 is:

```
//Copyright XILINX, Inc., 2011
void wakeup_w (newValue, startIndex, endIndex) {
  ...
  if (change (w[6:5])) {
     add_processes_to_execute_list ({P1});
  }
  if (change w(4:3)) {
     add_processes_to_execute_list ({P1, P2});
  }
  if (change w(2:2)) {
     add_processes_to_execute_list ({P2});
  }
}
```

Figures 3, 5:
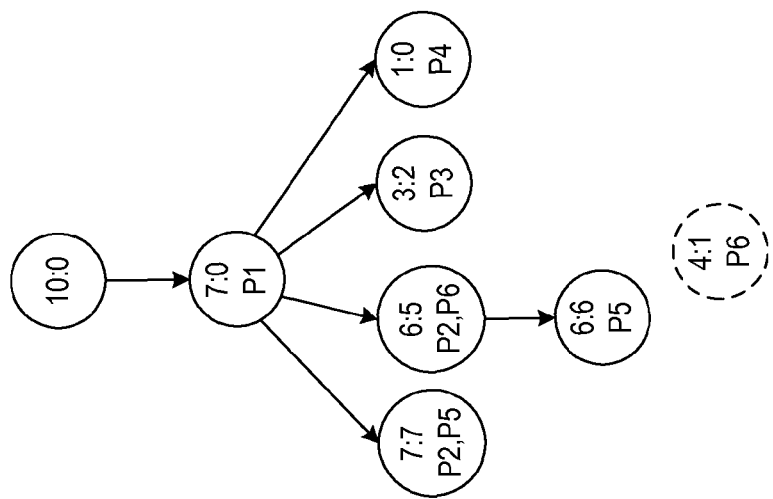
Figures 2, 5:
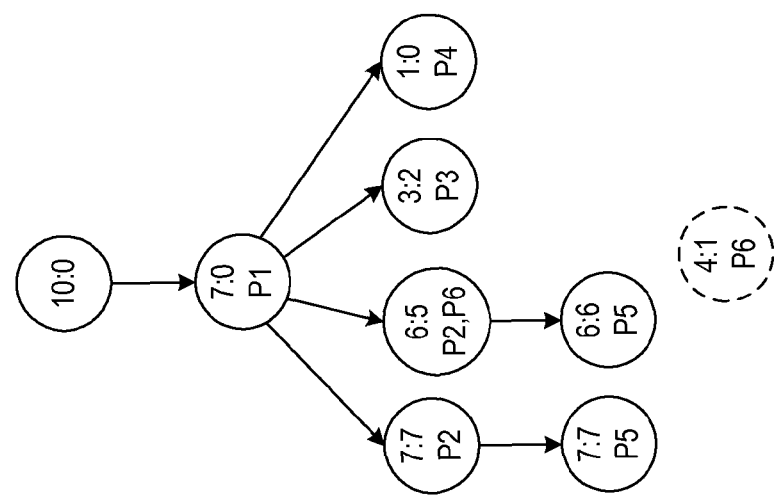
Figures 1, 5:
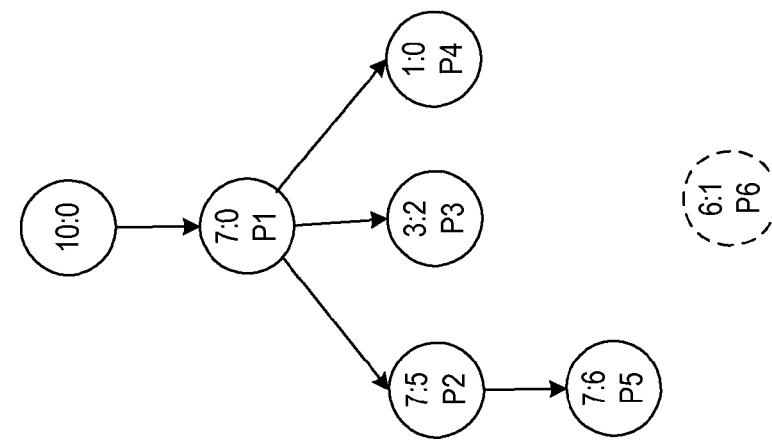
Figure 5:
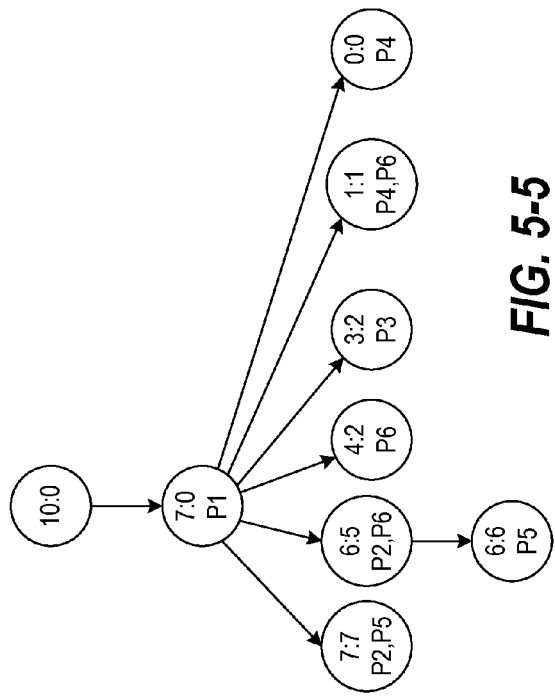
Figures 5, 6:
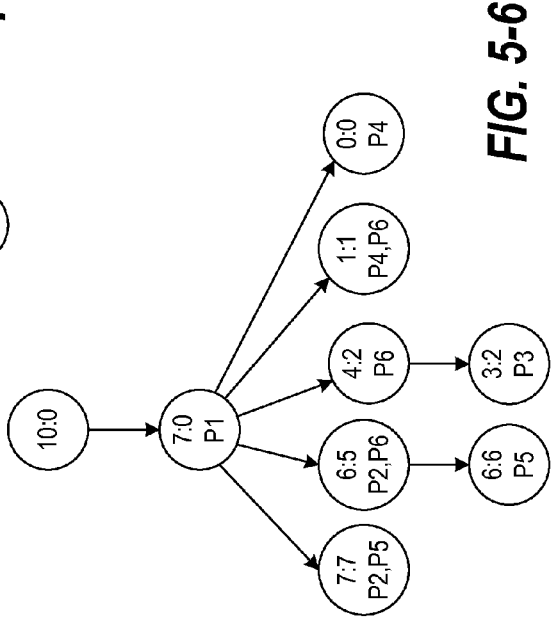
Figures 4, 5:
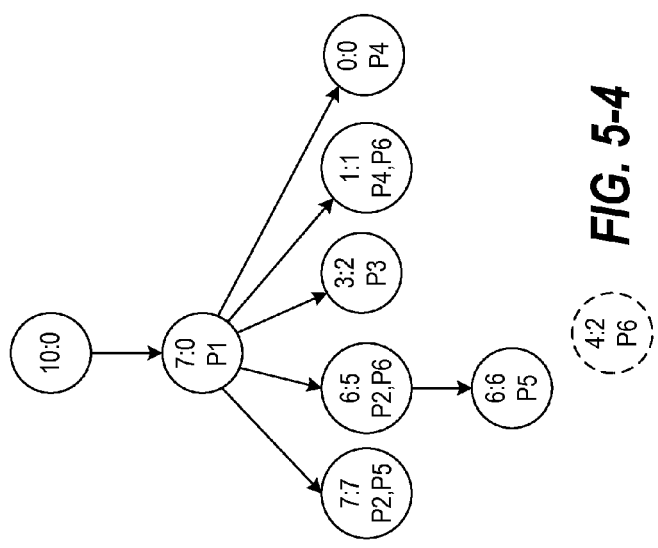
Figure 6:
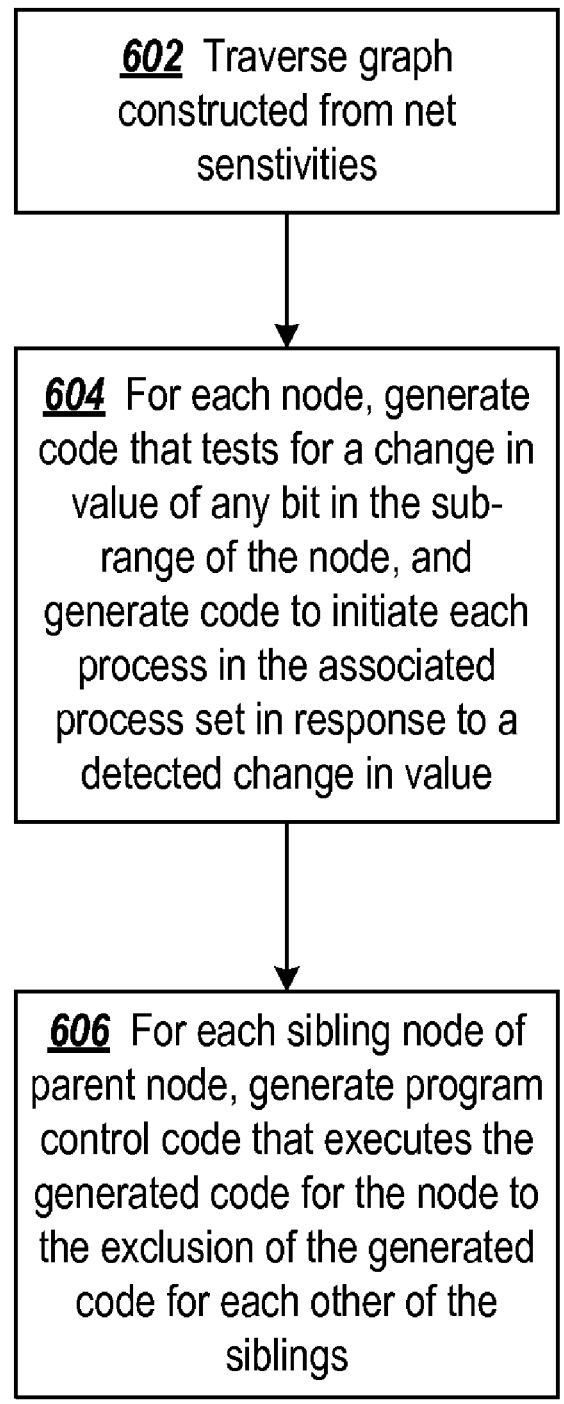

FIGS. 5-1-5-6 show a sequence of states of a graph created from a net having multiple processes with overlapping sensitivities on the bus. In FIGS. 5-1, the state of the graph shows the compiler having processed a declaration of a bus wire [10:0] w and declarations of multiple processes with overlapping sensitivities on that bus. Processes P1, P2, P3, P4, and P5 are sensitive to sub-ranges 7:0, 7:5, 3:2, 1:0, and 7:6, respectively. The declaration of P6 being sensitive to sub-range 6:1 remains to be processed, as illustrated by dashed node 6:1.

In an example implementation, processing a declaration of a process being sensitive to a sub-range of bits of the net involves traversing the graph from the root node 10:0, looking for the appropriate level at which to insert a node for the sub-range. The level at the node insertion process begins is the lowest level at which the range is completely contained. For the sub-range 6:1, the level at which the node is inserted is the level below sub-range 7:0.

The sub-range 6:1 intersects sub-ranges 7:5 and 1:0. The process of modifying the graph proceeds according to the algorithm described in the scenario of FIGS. 4-1-4-3 for intersecting sub-ranges. In an example implementation, the range splitting begins with the intersection at the upper end of the range. An alternative implementation may begin the range splitting at the lower end of the range.

FIGS. 5-2 shows that the sub-range 6:1 to be added is split into sub-ranges 6:5 and 4:1 because sub-range 6:1 intersects with the existing child sub-range 7:5. In addition, the existing child sub-range 7:5 is changed to 7:7 to provide mutual exclusivity with the new child sub-range 6:5. A node for new child sub-range 6:5 is added to the graph, and the process set, which includes P2, from the former node 7:5 is added to the process set of the new node, resulting in the process set for node 6:5 having P2 and P6.

Because the sub-range 7:5 was changed to 7:7, child sub-range 7:6 (FIGS. 5-1) is also changed to 7:7 (the sub-ranges of children must be proper subsets of the sub-range of the parent), and a new sub-range 6:6 is created to account for the sensitivity of P5 to bit 6, which was removed from the 7:6 sub-range. A node for the new sub-range 6:6 is added as a child of sub-range 6:5 because the sub-range 6:6 is totally contained in the sub-range 6:6 as shown in FIGS. 5-2. The sub-range 4:1 with P6 remains to be processed.

After changing the node 7:5 to 7:7 with process P2 and changing node 7:6 to 7:7, with P5, the two 7:7 nodes are merged and the process sets combined. The result is shown in FIGS. 5-3 with node 7:7 having the process set that includes P2 and P5. The sub-range 4:1 remains to be processed.

In traversing the graph to insert a node for the sub-range 4:1, the process finds that the sub-range 4:1 intersects sub-range 1:0 in the level below the parent sub-range 7:0. Since the sub-range 3:2 is wholly contained within the sub-range 4:1, the partial intersection is handled first. FIGS. 5-4 shows a new child sub-range 1:1, which is the intersection of 4:1 and 1:0, created below the sub-range 7:0, and the process sets (P6 from 4:1 and P4 from 1:0) from the intersecting sub-ranges having been added to the new child sub-range 1:1. The sub-range 1:0 (from FIGS. 5-3) is changed to 0:0 to provide for mutual exclusivity, and the sub-range 4:2 with process P6 remains to be processed.

Continuing from FIGS. 5-4 to FIGS. 5-5, the sub-range 4:2 remains to be processed. In traversing the graph, the process finds that the sub-range 4:2 totally encompasses the child sub-range 3:2 and does not intersect any of the other sub-ranges. Thus, as described in the scenario of FIGS. 3-1-3-3, a node 4:2 is added for the sub-range as a child of parent sub-range 7:0 as shown in FIGS. 5-5. FIGS. 5-6 shows the node for sub-range 3:2 having been moved to be a child of sub-range 4:2.

The wakeup function generated from the graph if FIGS. 5-6 is:

```
//Copyright XILINX, Inc., 2011
void wakeup_w (newValue, startIndex, endIndex) {
  ...
  if (change (w[7:0])) {
     add_processes_to_execute_list ({P1});
     if (change (w[7:7])) {
        add_processes_to_execute_list ({P2,P5});
     }
     if change (w[6:5])) {
        add_processes_to_execute_list ({P2,P6});
        if (change (w[6:6])) {
           add_processes_to_execute_list ({P5});
        }
     }
     if change (w[4:2])) {
        add_processes_to_execute_list ({P6});
        if (change (w[3:2])) {
           add_processes_to_execute_list ({P3});
        }
```

```
        }
        if change (w[1:1])) {
            add_processes_to_execute_list ({P4,P6});
        }
        if change (w[0:0])) {
            add_processes_to_execute_list ({P4});
        }
    }
  }
}
```

FIG. 6 is a flowchart of an example process for generating a specification of a wakeup function for processes that are sensitive to bits of a net from the generated net sensitivity graph. In one embodiment, the process traverses a net sensitivity graph as constructed from the declared signal sensitivities found in an HDL specification of a circuit design. Examples of net sensitivity graphs are those shown in FIGS. 2, 3-3, 4-3, and 5-6.

The process traverses the net sensitivity graph as shown by block 602. In visiting each node during the traversal, at block 604 the process generates code that tests for a change in value of any bit in the sub-range of the node. In addition, code is generated to conditionally initiate each process in the associated process set, with the condition based on whether or not a change in value is detected.

In addition to the code for testing for changes in bit values and code for initiating sensitive processes, code is generated for controlling which of the generated code for the sub-ranges gets executed, as shown by block 606. The generated code controls execution such that for a parent sub-range having mutually exclusive child sub-ranges, code is executed for checking for changes in bit values in only one of the child sub-ranges. This may be seen in the generated if and else-if statements in the wakeup function generated from the graph of FIGS. 5-6, for example. Once one of the if or else-if statements detects a change in any bit in the tested sub-range, subsequent else-if statements will not be executed.

It will be appreciated that the particular control statements will depend on simulation requirements and the target language. For example, the control statements may be switch statements, case statements, or goto statements.

In one embodiment, the process may select from different control statements based on characteristics of the circuit design. In selecting from different control statements and/or structures, consideration is given to the size of generated code. Large code leads to longer compiler times but simulation may be faster. Smaller code will be compiled faster but may result in longer simulation times. Large code may be structured to provide for efficient execution. For example, if through design analysis using the SDG it is determined that a set of nodes for a bus will be exercised more during simulation than another set of nodes, the code may be structured so that the check for the most frequent case occurs first in the generated code.

For timing simulation in which each bit of a design is typically individually referenced in a test, the generated code may be structured similarly to the code of Example 1 above, which may lead to long compile times. To address the issue, a pre-programmed function may be provided in the kernel, and the generated code passes a list of processes via the MEM file to the kernel function. The kernel function wakes up the referenced processes.

In another embodiment, the process may select from different control statements based on bus attributes of the net. The control statements may be selected based on the size of the bus, the number of children nodes of the children nodes of the bus node, whether the bits of the bus will store x or z values or only logic 1 and logic 0 values. The type of the bus, for example, record type, wire type, class type etc., may also be considered. In addition, weight may be given to the number of transaction functions that can be shared. A wakeup function may be shared by more than one bus if it wakes up the same set of processes for the different buses. Consideration is also give as to whether or not processes are sensitive to bus, asynchronous to the clock, and whether the process is used as a read-only or a write-only process.

Figure 7:
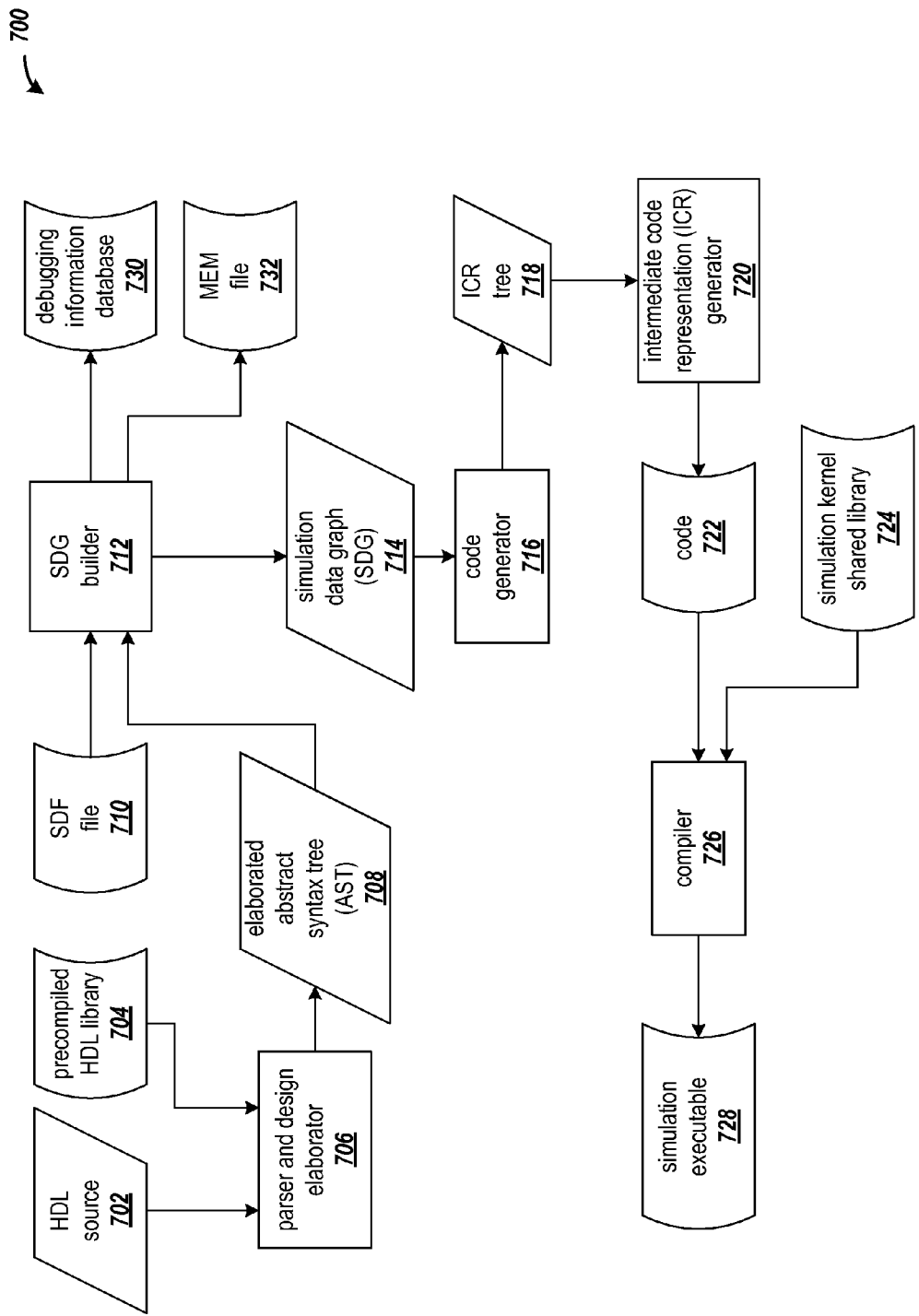
FIG. 7 is a diagram of a system 700 for generating a simulation model in accordance with one or more embodiments of the invention.

FIG. 7 is a diagram of a system 700 for generating a simulation model in accordance with one or more embodiments of the invention. A design, which is specified in HDL source 702, and a precompiled HDL library 704 are processed by the parser and design elaborator 706. The designer specifies one or more design tops for which the parsed dump is loaded by the design elaborator 706. The design elaborator 706 settles values of parameters and generics and creates connections amongst the modules of the design and creates an elaborated abstract syntax tree (AST) 708.

The simulation data graph (SDG) builder 712 generates an SDG 714 from the elaborated AST and the standard delay format (SDF) file 710. The elaborated AST is traversed to identify nets and net sensitivity ranges. Net sensitivity ranges are sub-ranges of bits of a net to which one or more processes are sensitive. A net includes a declared signal and port signals or slices of port signals that are connected to one or more bits of the declared signal.

The SDG 714 may be generated by storing all identified nets in a list, with each net being the root of an SDG. To support further processing of the SDG, edges may be added to the SDG to connect process nodes to nets and/or net sensitivity ranges can be added to the SDG. Also, additional nodes may be added to the SDG, such as nodes with driver information, to make generating simulation code easier.

Once the SDG has been generated, the code generator 716 generates an intermediate code representation (ICR) tree 718, and the ICR tree 718 is used by the ICR generator 720 to generate code 722. The code 722 contains executable statements of the processes of the circuit design. The ICR can be in a desired source language such as C or assembly. Alternatively, the ICR may be in object code. The generated code operations on the runtime simulation objects formatted in the MEM file 732, which is discussed further below.

The compiler 726 compiles the code 722, along with code from the simulation kernel shared library 724, into executable code 728, which is the simulation model of the circuit design specified in the HDL source 702.

The SDG builder 712 creates debugging information database 730 for use in debugging the design during simulation. The debugging information database 730 includes signal-to-net relationships, scope information, and file-to-line mapping information, for example. The debugging information database 730 may be loaded during simulation to support debugging while the simulation is executing. The generation of the debugging information database 730 may be skipped to reduce the time required for compilation and improve the speed of executing the simulation.

In one embodiment, the SDG builder generates MEM file 732. MEM file 732 contains the simulation objects that are accessed by the simulation executable 728 at runtime. MEM file 732 is formatted to allow loading of the file directly from retentive storage to memory to commence simulation. The runtime simulation objects are laid out at fixed offsets from either the beginning of the file (global offset) or from the starting point of a section pertaining to a particular module (local offset). The global and local offsets are stored in appropriate nodes of the SDG for allowing other components of system 700 to access the runtime simulation objects. The state of the runtime simulation objects as reflected in system memory may, during simulation runtime, be periodically saved to retentive storage as a checkpoint of the simulation. The format of the checkpoint is the same as the MEM file 732. At a later time, the simulation may be restarted beginning at the state at which the checkpoint was taken by reloading the state of the runtime simulation objects which are in the MEM file format.

A design properties section at the beginning of the MEM file 732 may be reserved for sharing data between the simulation kernel and the executable code of the simulation model. For example, the current simulation time or the number of currently executing processes can be stored in the design properties section. The design properties section may include further information such as whether the source design is in a single language or a mixed language. The design properties section may also indicate whether the target simulation is to be a timing simulation RTL simulation so that the simulation kernel can be customized to provide for maximum simulation speed.

Figure 8:
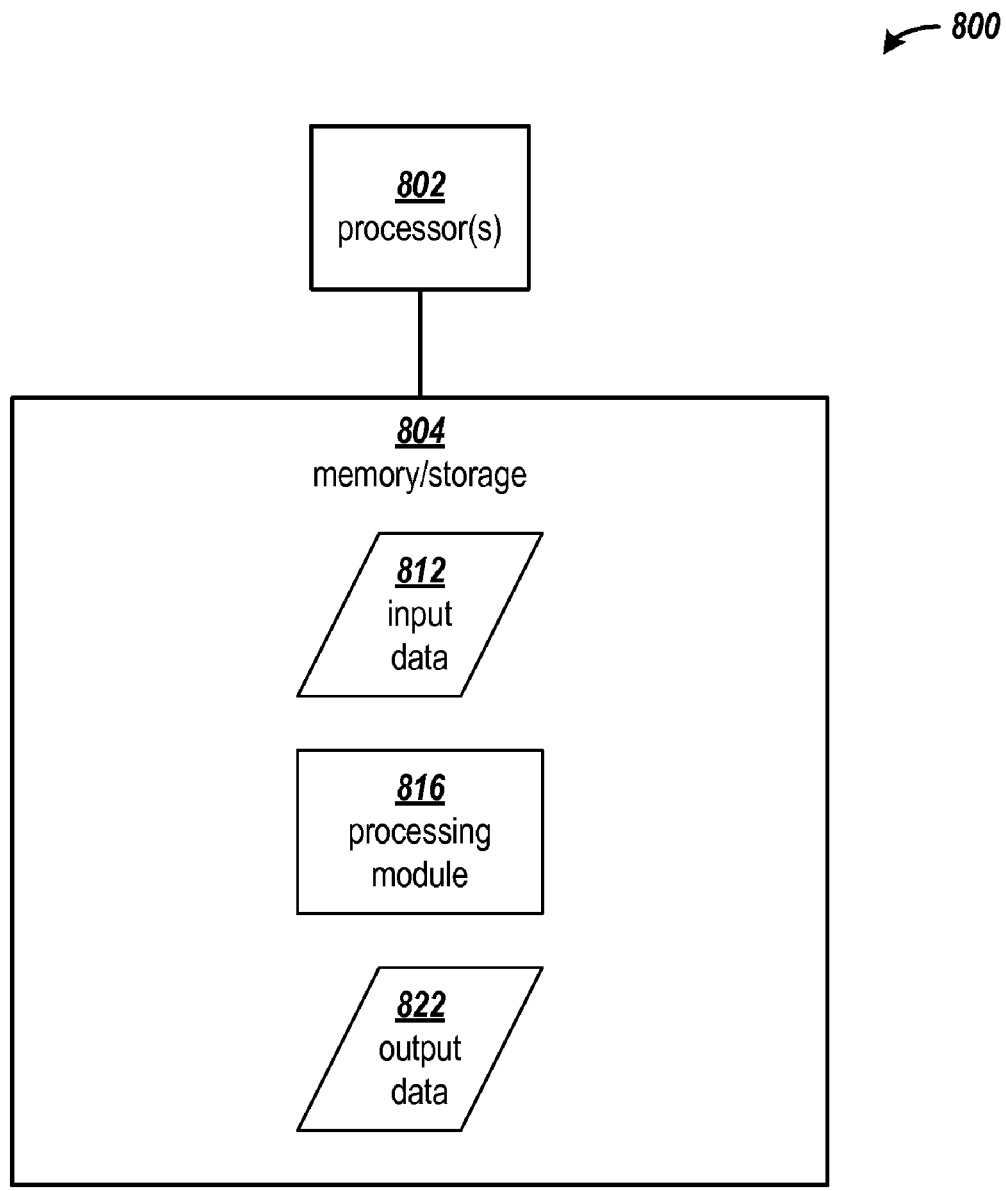
FIG. 8 is a block diagram of an example computing arrangement on which the processes described herein may be implemented.

FIG. 8 is a block diagram of an example computing arrangement on which the processes described herein may be implemented. Those skilled in the art will appreciate that various alternative computing arrangements, including one or more processors and a memory arrangement configured with program code, would be for hosting the processes and data structures of the different embodiments. In addition, program code that implements the processes may be provided via a variety of computer-readable storage media or delivery channels such as magnetic or optical disks or tapes, electronic storage devices, or as application services over a network.

Computing arrangement 800 includes one or more processors 802 coupled to a memory/storage arrangement 804. The architecture of the computing arrangement depends on implementation requirements as would be recognized by those skilled in the art. The processor 802 may be one or more general purpose processors, or a combination of one or more general purpose processors and suitable co-processors, or one or more specialized processors (e.g., RISC, pipelined, etc.).

The memory/storage arrangement 804 is representative of hierarchical storage commonly found in computing arrangements. Such hierarchical storage typically includes multiple levels of cache memory, a main memory, and local and/or remote persistent or persistent storage such as provided by magnetic disks (not shown). The memory/storage arrangement may include one or both of local and remote memory/storage, remote storage being coupled to the processor arrangement via a local area network, for example.

The processor arrangement 802 executes the software stored in memory/storage arrangement 804, and reads data from and stores data to the memory/storage arrangement according to the processes described above. For example, processing module 816 includes instructions that implement the processes described herein when executed by processor (s) 802. The input data 812 represents an input circuit design, library files, etc., and the output data 822 represents the simulation executable and intermediate data generated in the process of generating the simulation executable. An operating system (not shown) manages the resources of the computing arrangement.

The embodiments are thought to be applicable to a variety of systems for generating simulation models. Other aspects and embodiments will be apparent to those skilled in the art from consideration of the specification. The embodiments may be implemented as one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A method of generating one or more functions for activating processes in a simulation model of a circuit design, comprising:
    using a processor to perform one or more of:
        determining at least two mutually exclusive sub-ranges of a plurality of bits of a net of the circuit design, each of the sub-ranges including at least one bit of the plurality of bits of the net;
        determining a respective process set associated with each sub-range of the plurality of bits, wherein each process set specifies one or more processes to activate in response to a change in value of a bit in the associated sub-range of the plurality of bits; and
        generating a specification of a wakeup function in the simulation model, wherein the specification includes:
            for each sub-range of the plurality of bits, a test for a change in value of at least one bit in the sub-range of the plurality of bits, and an initiation of each process in the associated process set in response to a detected change in value of the at least one bit; and
            control, responsive to a detected change in value of at least one bit in one of the sub-ranges of the plurality of bits, that bypasses a test for a change in value of at least one bit in at least one other of the sub-ranges of the plurality of bits.

2. The method of claim 1, further comprising performing the determining of at least two mutually exclusive sub-ranges, the determining of a respective process set, and the generating a specification of a wakeup function for each net in the circuit design.

3. The method of claim 1, further comprising generating a hierarchical graph of parent and children nodes and edges connecting the parent and children nodes, each node representing a sub-range of the plurality of bits, each child node representing a sub-range of a sub-range of the plurality of bits of a parent node, and the sub-ranges of the plurality of bits of each child node of a parent node being mutually exclusive sub-ranges of the sub-range of the plurality of bits of the parent node.

4. The method of claim 3, wherein the generating of the specification of the wakeup function includes:
    traversing the hierarchical graph of parent and children nodes; and
    as each node is visited in traversing the graph, generating at least one first program statement that tests for a change in each bit in the sub-range of the plurality of bits represented by the node and at least one second program statement that conditionally invokes each process in the process set associated with the sub-range of the plurality of bits based on the test by the at least one first program statement.

5. The method of claim 1, wherein the generating of the specification of the wakeup function includes generating if-program statements that test for changes in values of the bits in the at least two sub-ranges of the plurality of bits.

6. The method of claim 1, wherein the generating of the specification of the wakeup function includes generating switch-program statements that test for changes in values of the bits in the at least two sub-ranges of the plurality of bits.

7. The method of claim 1, wherein the generating of the specification of the wakeup function includes:
selecting one of a plurality of different control flow statements in response to parameters of the circuit design; and
including in the specification of the wakeup function, the selected control flow statements that test for changes in values of the bits in the at least two sub-ranges of the plurality of bits.

8. The method of claim 1, wherein the generating of the specification of the wakeup function includes:
selecting one of a plurality of different control flow statements in response to bus attributes of the net of the circuit design; and
including in the specification of the wakeup function, the selected control flow statements that test for changes in values of the bits in the at least two sub-ranges of the plurality of bits.

9. The method of claim 1, wherein the generating of the specification of the wakeup function includes:
selecting one of a plurality of different control flow statements in response to characteristics of a graph of the circuit design; and
including in the specification of the wakeup function, the selected control flow statements that test for changes in values of the bits in the at least two sub-ranges of the plurality of bits.

10. A non-transitory computer-readable medium with executable code stored thereon for simulation of a circuit design, wherein the executable code when executed on a processor perform a method, comprising:
determining at least two mutually exclusive sub-ranges of a plurality of bits of a net of the circuit design, each of the sub-ranges including at least one bit of the plurality of bits of the net;
determining a respective process set associated with each sub-range of the plurality of bits, wherein each process set specifies one or more processes to activate in response to a change in value of a bit in the associated sub-range of the plurality of bits; and
generating a specification of a wakeup function in the simulation model, wherein the specification includes:
for each sub-range of the plurality of bits, a test for a change in value of at least one bit in the sub-range of the plurality of bits, and an initiation of each process in the associated process set in response to a detected change in value of the at least one bit; and
control, responsive to a detected change in value of at least one bit in one of the sub-ranges of the plurality of bits, that bypasses a test for a change in value of at least one bit in at least one other of the sub-ranges of the plurality of bits.

11. The medium of claim 10, further comprising performing the determining of at least two mutually exclusive sub-ranges, the determining of a respective process set, and the generating a specification of a wakeup function for each net in the circuit design.

12. The medium of claim 10, further comprising generating a hierarchical graph of parent and children nodes and edges connecting the parent and children nodes, each node representing a sub-range of the plurality of bits, each child node representing a sub-range of a sub-range of the plurality of bits of a parent node, and the sub-ranges of the plurality of bits of each child node of a parent node being mutually exclusive sub-ranges of the sub-range of the plurality of bits of the parent node.

13. The medium of claim 12, wherein the generating of the specification of the wakeup function includes:
traversing the hierarchical graph of parent and children nodes; and
as each node is visited in traversing the graph, generating at least one first program statement that tests for a change in each bit in the sub-range of the plurality of bits represented by the node and at least one second program statement that conditionally invokes each process in the process set associated with the sub-range of the plurality of bits based on the test by the at least one first program statement.

14. The medium of claim 10, wherein the generating of the specification of the wakeup function includes:
selecting one of a plurality of different control flow statements in response to parameters of the circuit design; and
including in the specification of the wakeup function, the selected control flow statements that test for changes in values of the bits in the at least two sub-ranges of the plurality of bits.

15. The medium of claim 10, wherein the generating of the specification of the wakeup function includes:
selecting one of a plurality of different control flow statements in response to bus attributes of the net of the circuit design; and
including in the specification of the wakeup function, the selected control flow statements that test for changes in values of the bits in the at least two sub-ranges of the plurality of bits.

16. The medium of claim 10, wherein the operations further include:
generating an abstract syntax tree from a hardware description language specification of the circuit design;
generating a net sensitivity graph from the abstract syntax tree; and
using the net sensitivity graph in generating the specification of the wakeup function.

17. The medium of claim 16, wherein the operations further include:
generating a format for runtime simulation objects, the runtime simulation objects for storing state of the runtime simulation objects during simulation of the circuit design;
including in the executable code for simulation of a circuit design, code for performing operations including:
storing state of the runtime simulation objects in the generated format in a runtime memory file in retentive storage; and
loading state of the runtime simulation objects from the retentive storage into the memory arrangement at runtime to be accessed during simulation.

18. The medium of claim 17, wherein the operations further include, including in the executable code for simulation of a circuit design, code for performing operations including storing in the runtime memory file, at least one of a current simulation time or a list of currently executing processes, wherein the runtime memory file is accessible to a simulation kernel and executable code that models the circuit design.

19. The medium of claim 18, wherein the operations further include:
including in the executable code for simulation of a circuit design, code for performing operations including:
periodically storing a current state of runtime simulation objects of the runtime memory file in retentive storage; and
periodically storing a current state of the simulation kernel corresponding to the current state of the runtime simulation objects.

* * * * *